United States Patent
Bauch et al.

(10) Patent No.: US 10,953,787 B2
(45) Date of Patent: Mar. 23, 2021

(54) HEADLAMP LEVELING SYSTEM AND METHOD

(71) Applicant: Ford Global Technologies, LLC, Dearborn, MI (US)

(72) Inventors: David James Bauch, South Lyon, MI (US); Stephan Biggs, Manitou Beach, MI (US); Ryan Craig, Coplay, PA (US); Robert Miller, Plymouth, MI (US); Todd N. Clark, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 335 days.

(21) Appl. No.: 15/826,873

(22) Filed: Nov. 30, 2017

(65) Prior Publication Data
US 2019/0160999 A1  May 30, 2019

(51) Int. Cl.
*B60Q 1/10* (2006.01)
*G01P 15/08* (2006.01)
*B60C 23/04* (2006.01)
*B60C 23/00* (2006.01)
*G01C 9/06* (2006.01)

(52) U.S. Cl.
CPC .............. *B60Q 1/10* (2013.01); *B60C 23/04* (2013.01); *G01P 15/0802* (2013.01); *B60C 23/00* (2013.01); *G01C 9/06* (2013.01)

(58) Field of Classification Search
CPC ...... B06Q 10/10; B06C 23/04; G01P 15/0802
USPC ....................................................... 362/466
See application file for complete search history.

(56) References Cited

U.S. PATENT DOCUMENTS

| | | | |
|---|---|---|---|
| 8,712,599 B1 | 4/2014 | Westpfahl | |
| 9,028,117 B2 * | 5/2015 | Haest | B60Q 1/076 362/475 |
| 9,421,903 B2 | 8/2016 | Falb | |
| 2009/0045323 A1 * | 2/2009 | Lu | G06K 9/00825 250/208.1 |
| 2010/0168958 A1 * | 7/2010 | Baino | B60Q 1/12 701/36 |
| 2013/0204157 A1 * | 8/2013 | Clark | G01G 23/3735 600/547 |
| 2016/0001695 A1 | 1/2016 | Fennelly | |

(Continued)

FOREIGN PATENT DOCUMENTS

| KR | 20020014303 A | 2/2002 |
| KR | 20130080251 A | 7/2013 |
| KR | 20150055396 A | 5/2015 |

OTHER PUBLICATIONS

Glascott-Jones, Andrew. Sensors Magazine, "MEMS for Tilt Measurement and Headlight Leveling," Oct. 1, 2008. http://www.sensorsmag.com/components/mems-for-tilt-measurement-and-headlight-leveling.

(Continued)

*Primary Examiner* — Michael G Lee
*Assistant Examiner* — David Tardif
(74) *Attorney, Agent, or Firm* — David Coppiellie; Carlson, Gaskey & Olds, P.C.

(57) ABSTRACT

A motor vehicle according to an exemplary aspect of the present disclosure includes, among other things, a sensor, a headlamp, and a controller configured to adjust an aim of the headlamp based on a signal from the sensor. The controller is configured to account for a zero drift of the sensor. A method is also disclosed.

23 Claims, 3 Drawing Sheets

(56) References Cited

U.S. PATENT DOCUMENTS

2016/0001696 A1 1/2016 Uchida et al.
2019/0147263 A1* 5/2019 Kuehnle .............. G07C 5/0808
340/439

OTHER PUBLICATIONS

MEMSIC, Powerful Sensing Solutions; "Headlight Leveling," Copyright 2017.

* cited by examiner

HEADLAMP LEVELING SYSTEM AND METHOD

TECHNICAL FIELD

This disclosure relates to a headlamp leveling system and method.

BACKGROUND

Motor vehicles are known to include headlamps that generate a beam of light, which illuminates the road ahead of the vehicle. Some headlamps are capable of being aimed such that the beam of light is focused on the road. If not properly focused on the road, the beam of light may be a nuisance for oncoming traffic.

Manual headlamp leveling systems are known. Such systems include mechanical linkages and knobs, which are manipulated by a user to aim the headlamps. Automatic headlamp leveling systems are also known. At the time of filing this disclosure, some geographic locations (such as in non-U.S. markets, like Europe) require certain vehicles to include automatic headlamp leveling systems. Such automatic systems adjust the aim of the headlamps without requiring user intervention.

SUMMARY

A motor vehicle according to an exemplary aspect of the present disclosure includes, among other things, a sensor, a headlamp, and a controller configured to adjust an aim of the headlamp based on a signal from the sensor. The controller is configured to account for a zero drift of the sensor.

In a further non-limiting embodiment of the foregoing motor vehicle, the controller is configured to account for the zero drift of the sensor brought about by a change in an environmental condition of the sensor.

In a further non-limiting embodiment of any of the foregoing motor vehicles, the environmental condition of the sensor is a temperature.

In a further non-limiting embodiment of any of the foregoing motor vehicles, the controller is configured to determine the zero drift of the sensor associated with a particular temperature by referencing a lookup table.

In a further non-limiting embodiment of any of the foregoing motor vehicles, the zero drift of the sensor is brought about by degradation of the sensor over time.

In a further non-limiting embodiment of any of the foregoing motor vehicles, the sensor is configured to generate a signal indicative of a pitch of the motor vehicle.

In a further non-limiting embodiment of any of the foregoing motor vehicles, the controller is configured to interpret signals from the sensor as corresponding to changes in pitch brought about by a change in road angle or by a change in vehicle load.

In a further non-limiting embodiment of any of the foregoing motor vehicles, the controller interprets a change in pitch when a velocity of the motor vehicle slows to zero as a reference road angle.

In a further non-limiting embodiment of any of the foregoing motor vehicles, when the motor vehicle is stopped, the controller interprets a change in pitch relative to the reference road angle as a change in pitch brought about by a change in vehicle load.

In a further non-limiting embodiment of any of the foregoing motor vehicles, the controller interprets a change in pitch during a time when the vehicle is not in motion as being brought about by a change in vehicle load.

In a further non-limiting embodiment of any of the foregoing motor vehicles, the controller interprets a change in pitch during a time when a vehicle door is open as being brought about by a change in vehicle load.

In a further non-limiting embodiment of any of the foregoing motor vehicles, the controller interprets a change in pitch when the change in pitch coincides with a change in tire pressure as being brought about by a change in vehicle load.

In a further non-limiting embodiment of any of the foregoing motor vehicles, the controller further monitors a status of all vehicle doors, a pressure of all vehicle tires, and vehicle location.

In a further non-limiting embodiment of any of the foregoing motor vehicles, the sensor is an accelerometer.

In a further non-limiting embodiment of any of the foregoing motor vehicles, the sensor is mounted to one of restraint control module and a headlight control module.

A method according to an exemplary aspect of the present disclosure includes, among other things, accounting for a zero drift of a sensor when adjusting an aim of a headlamp based on a signal from the sensor.

In a further non-limiting embodiment of the foregoing method, the zero drift is brought about by a change in an environmental condition of the sensor.

In a further non-limiting embodiment of any of the foregoing methods, the environmental condition of the sensor is a temperature.

In a further non-limiting embodiment of any of the foregoing methods, the method includes adjusting the aim of the headlamp based on a change in pitch of a motor vehicle brought about by at least a change vehicle load.

In a further non-limiting embodiment of any of the foregoing methods, the method includes storing a reference road angle, and determining a change in pitch brought about by a change in load by comparing a change in pitch when the vehicle is stopped to the reference road angle.

BRIEF DESCRIPTION OF THE DRAWINGS

In FIG. 1, the headlamps of the vehicle are activated and illuminate the road ahead of the vehicle.

DETAILED DESCRIPTION

This disclosure relates to a headlamp leveling system and method for a motor vehicle. In a first aspect of this disclosure, a controller is configured to adjust an aim of a headlamp based on a signal from a sensor, and the controller is configured to account for a zero drift of the sensor. In this way, the controller accounts for variations in the signal level of the sensor, which increases the accuracy of the aim of the headlamps.

In other aspects of this disclosure, the controller is configured to determine whether a change in vehicle pitch is due to a change in road angle or a change in vehicle load, and to adjust the aim of the headlamps accordingly. In a further aspect of this disclosure, the controller is configured to adjust headlamp aim based on other factors, such as whether the vehicle doors are open, whether there is a change in tire pressure, or based on vehicle location.

Figure 1:
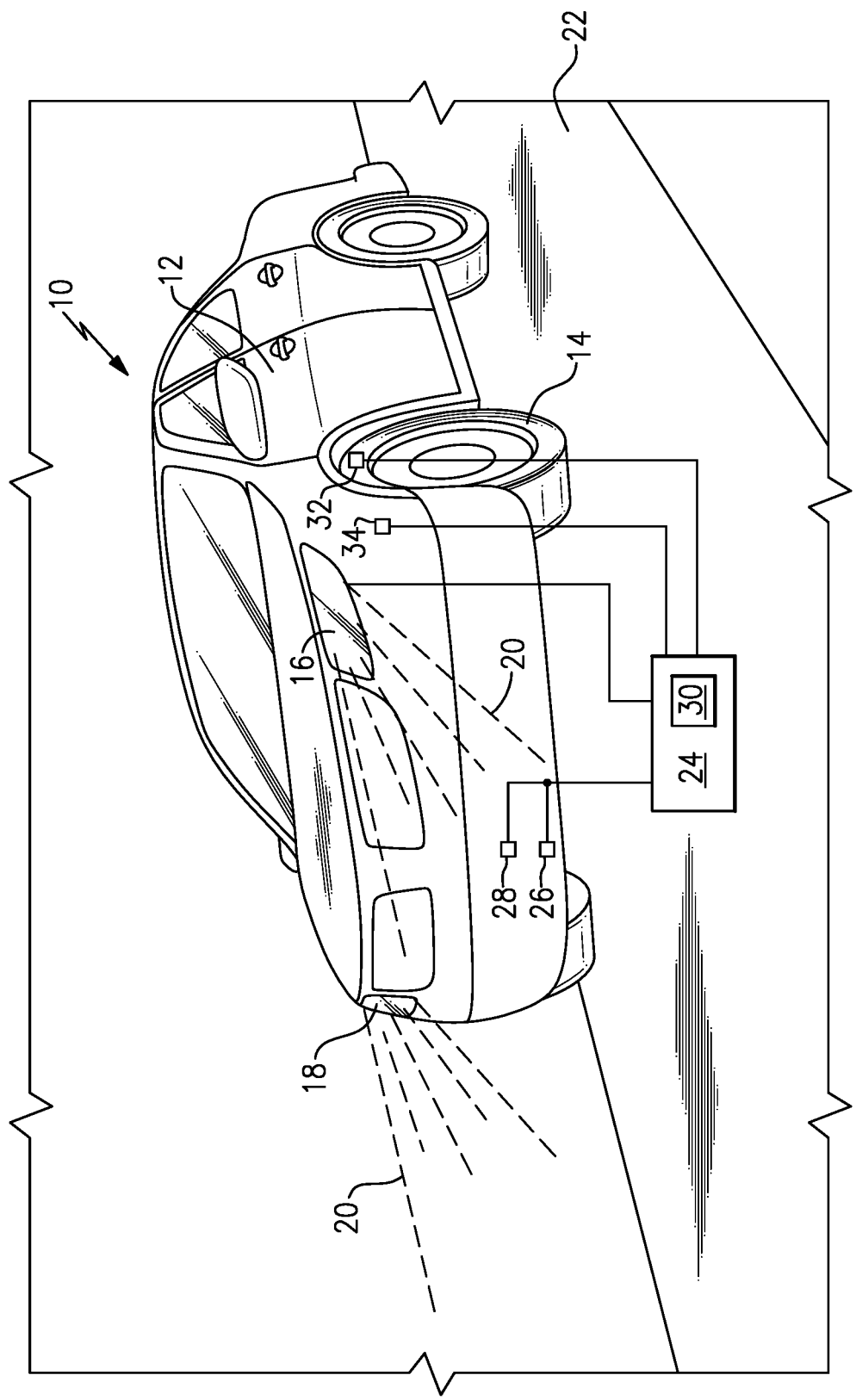
FIG. 1 is a front-perspective view of a motor vehicle.

FIG. 1 illustrates a motor vehicle 10, which in this example is a sedan. The vehicle 10 includes a plurality of vehicle doors 12, a plurality of tires 14, and first and second headlamps 16, 18, which are sometimes referred to as head lights. The first and second headlamps 16, 18 are selectively activated, and, when activated, generate a beam of light 20 which illuminates a road surface 22 ahead of the vehicle 10.

If the headlamps 16, 18 are not properly aimed, the beam of light 20 will not properly illuminate the road surface 22 and may also be a nuisance to oncoming traffic. To this end, the vehicle 10 includes a controller 24 configured to adjust the aim of the first and second headlamps 16, 18. The controller 24 adjusts the aim of the headlamps 16, 18 automatically without requiring user intervention. In this disclosure, the aim of the headlamps 16, 18 refers to the configuration of the headlamps 16, 18 that results in a particular angle of the beam of light 20. Adjustments to the aim of the headlamps 16, 18 may be accomplished, in one example, by making adjustments to the position of bulbs within the headlamps 16, 18. The bulbs may be adjustable in a known manner, such as by a known type of actuator assembly, which is electrically coupled to the controller 24 and responsive to commands from the controller 24. Thus, reference to the controller 24 adjusting the aim of the headlamps 16, 18, refers to the controller 24 instructing components of the vehicle 10 to adjust the angle of the beam of light 20. In most cases, reference to aim of the headlamps 16, 18 refers to a vertical aim of the headlamps 16, 18, although this disclosure does extend to side-to-side headlamp aim.

In this disclosure, the controller 24 is configured to adjust the aim of the headlamps 16, 18 based on a signal from at least one sensor, such as a pitch sensor 26, which is shown schematically in FIG. 1. The pitch sensor 26 may be an accelerometer, in one example, configured to generate a signal indicative of a pitch of the vehicle 10. The pitch of the vehicle 10 is the orientation of the vehicle 10 relative to the road surface 22. In a further example, the pitch sensor 26 is a g-accelerometer, configured to generate signals indicative of changes in the pitch of the vehicle 10 in three dimensions (i.e., relative to x-, y-, and z-axes). The pitch sensor 26 may be one of a vertical accelerometer and a longitudinal accelerometer. In other examples, the pitch sensor 26 may alternatively or additionally be mounted to a safety canopy, an airbag, a restraints control module (RCM), or a headlight control module of the vehicle 10. To this end, the pitch sensor 26 need not be a new, dedicated sensor, but rather this disclosure can make use of sensors that may already exist in the vehicle 10. While only one pitch sensor 26 is shown, there may be a plurality of pitch sensors 26 electrically coupled to the controller 24.

The controller 24 is further electrically coupled to an environmental sensor 28, configured to generate a signal indicative of one or more environmental conditions of the pitch sensor 26, including temperature, pressure, and humidity, as examples. The environmental sensor 28 may be mounted adjacent the pitch sensor 26 or may be mounted directly to the pitch sensor 26. Information from the environmental sensor 28 is used, in this disclosure, by the controller 24 to determine whether there is zero drift in the signal from the pitch sensor 26. Zero drift is a phenomenon in which a signal level of a sensor varies from a set zero value during use. Zero drift introduces error into the measurement equal to the amount of the variation. Zero drift may result from changes in environmental conditions, electronics stabilizing, or degradation of the sensor over time.

Before the pitch sensor 26 is used in the vehicle 10, the zero drift of the pitch sensor 26 is determined by monitoring the behavior of the pitch sensor 26, or sensors of a similar type, in various environmental conditions. In some examples, the manufacturer of the pitch sensor 26 determines the zero drift of the pitch sensor 26 in various environmental conditions and provides those specifications to its customers. The known zero drift behavior of the pitch sensor 26 is stored in a lookup table 30, which is stored in the controller 24 in one example. In one example, the lookup table 30 includes values correlating a temperature of the pitch sensor 26 to various zero drift values. As such, the controller 24 is configured to relate the output of the environmental sensor 28 to a zero drift value. The way in which the controller 24 uses the zero drift value will be discussed in more detail below.

In addition to the pitch sensor 26 and the environmental sensor 28, the controller 24 may be electrically coupled to a tire pressure sensor 32. While only one tire pressure sensor 32 is shown in FIG. 1, each of the tires 14 of the vehicle 10 may include a tire pressure sensor configured to generate signals indicative of the pressure of the tires 14. The controller 24 also receives signals indicative of whether the doors 12, including the trunks, lift gates, and tailgates (if present), are open or closed. Additionally, the vehicle 10 may include a global positioning system (GPS) unit 34 configured to send and receive signals indicative of the geographical position of the vehicle 10. As will be discussed in more detail below, the controller 24 may use information from these sources to determine whether an adjustment of headlamp aim is required.

The controller 24, sensors 26, 28, 32, the lookup table 30, and the GPS unit 34 are shown schematically in the figures for purposes of illustration. Further, it should be understood that the sensors 26, 28, 32 could be provided by any known type of sensor, including transducers, thermistors, etc. Regarding the controller 24, it should be understood that the controller 24 could be part of an overall vehicle control module, such as a vehicle system controller (VSC), o body control module (BCM), an RCM, or a headlight control module. Alternatively, the controller 24 may be a standalone controller separate from the VSC and the BCM. Further, the controller 24 may be programmed with executable instructions for interfacing with and operating the various components of the vehicle 10. The controller 24 additionally includes a processing unit and non-transitory memory for executing the various control strategies and modes of the vehicle system. Further, while it is mentioned that the lookup table 30 may be stored on the controller 24, the lookup table 30 may be stored remotely.

Figure 2:
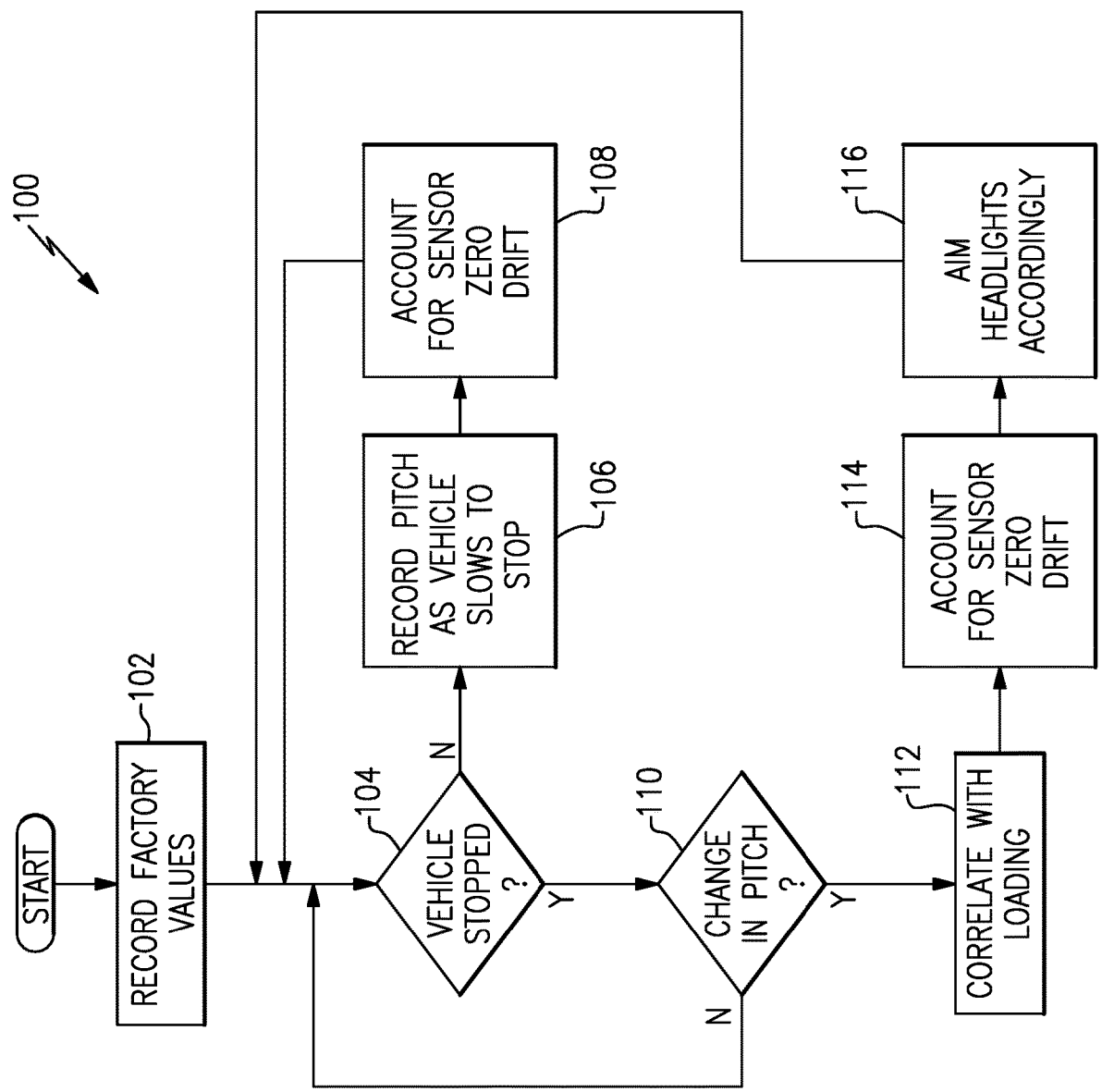
FIG. 2 is a flow chart representative of an example method.

FIG. 2 is a flow chart representative of a method 100 of this disclosure. Using the method 100, the controller 24 can adjust an aim of the headlamps 16, 18 accurately, accounting for various factors such as zero drift of the pitch sensor 26. When discussing the method 100, FIGS. 1 and 3-5 will be referenced. It should be understood that the method 100 will be performed by the controller 24, and other components of the vehicle 10, such as those discussed above relative to FIG. 1.

Figure 3:
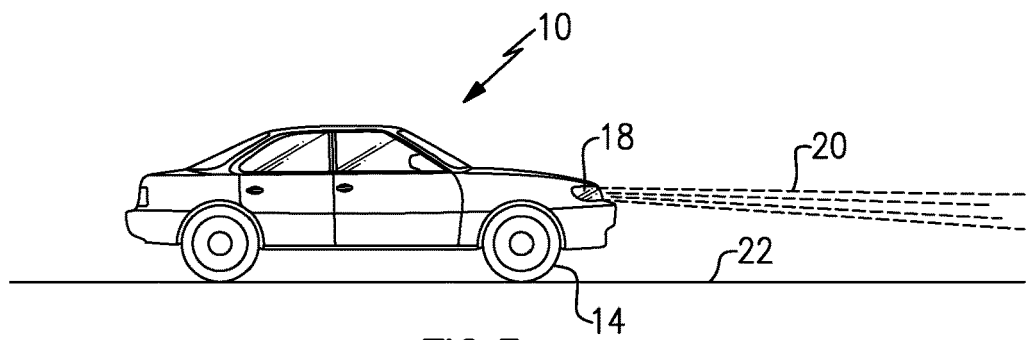
FIG. 3 illustrates a vehicle in a factory setting.

The method 100 begins at 102, when the vehicle 10 is in a factory setting, which is generally shown in FIG. 3. In the factory setting, in one example, the vehicle 10 has just been assembled, and has not yet been delivered to a customer or dealer. Before the vehicle 10 is driven, the headlamps 16, 18 are aimed in a controlled environment. In the controlled environment, the vehicle is not moving and is on a flat, level surface. Further, a tire pressure of the tires 14 is recorded, and there is no load (or a minimal load) in the vehicle. The aim of the headlamps 16, 18 is recorded, and the controller 24 stores the values for road angle, tire pressure, load, etc., associated with the aim of the headlamps 16, 18. The controller 24 also stores a relationship between the vehicle 10 and gravity, to define the longitudinal axis of the vehicle 10, which is represented as a reference pitch P in FIG. 5, and to relate the pitch of the vehicle 10 in the factory setting to a desired headlamp aim. During use of the vehicle 10, the controller 24 will attempt, as best it can, to approximate the aim of the headlamps 16, 18 in the factory setting. The controller 24 can also be reset and recalibrated at a service facility after a period of use.

Once the factory values are stored and the headlamps 16, 18 are calibrated, the vehicle 10 is ready for use. During use, the controller 24 is configured to determine whether a change in vehicle pitch has occurred such that an adjustment to headlamp aim is required. In part, the controller 24 is configured to make such determinations by determining whether the change in vehicle pitch is due to changes in road angle (i.e., road grade) or changes in a load of the vehicle (e.g., cargo load, occupants, etc.). In one example, the controller 24 draws this distinction by first determining whether the vehicle 10 is stopped, at 104. The vehicle may determine that the vehicle 10 has stopped by monitoring certain conditions, such as vehicle speed, whether the vehicle is in park, whether one or more doors 12 are open, etc. In general, if a change in pitch occurs while the vehicle 10 is stopped, the controller 24 associates that change in pitch with a change in vehicle load, whereas if a change in pitch occurs when the vehicle 10 is in motion, the controller 24 associates that change in pitch with a change in road angle.

Typically, the controller 24 will not adjust the aim of the headlamps 16, 18 when a change in pitch is caused by a change in road angle while the vehicle is in motion. In part, the controller 24 assumes that the vehicle 10 remains substantially parallel to the road surface 22 while the vehicle 10 is in motion. There are exceptions, however, such as when the vehicle 10 experiences a prolonged period of acceleration, or when a tire pressure of one of the tires unexpectedly changes. In those cases, as examples, the vehicle may experience a change in pitch that warrants an adjustment in headlamp aim.

This being said, the controller 24 is configured to account for road angle when adjusting headlamp aim. In particular, the controller 24 is configured to track the road angle of the vehicle 10 when the vehicle parks. Thus, the vehicle 10 is configured to remember the road angle of the vehicle 10 when it is turned off, and accounts for that road angle when the vehicle is turned back on.

Figure 4:
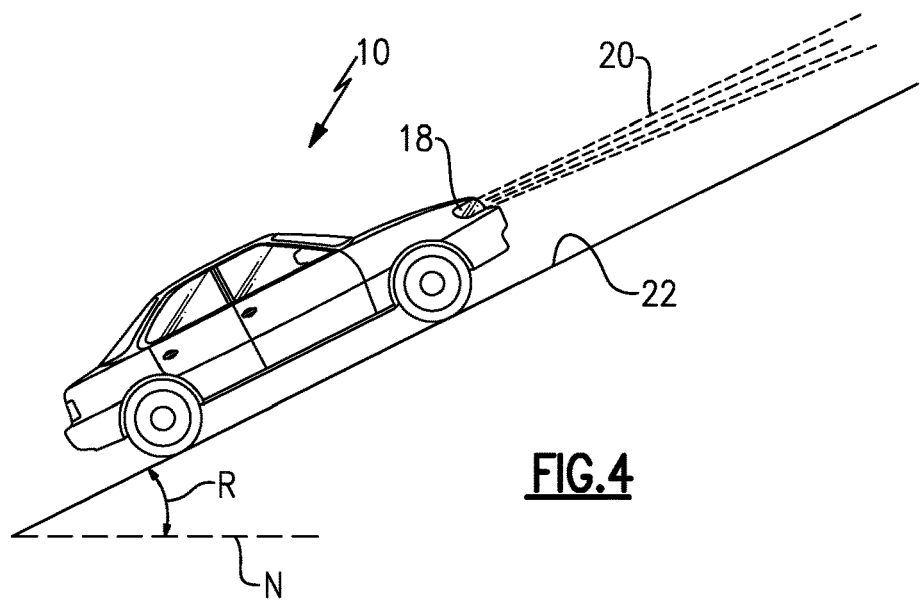
FIG. 4 illustrates a vehicle on an inclined road.

For example, at 106, the controller 24 is configured to determine a road angle R (FIG. 4) of the vehicle 10 by monitoring and recording the pitch of the vehicle 10 as the vehicle 10 slows to a stop. In FIG. 4, the vehicle 10 has slowed to a stop and is parked on a road surface 22 inclined at a road angle R relative to a normal N to gravity. In another example, the controller 24 uses information from the GPS unit 34 to determine a vehicle location, and the controller 24 identifies the road angle R using information from a stored map or from a previously-recorded road angle R in this geographical location. The recorded road angle R is referred to herein as a reference road angle. The controller 24 remembers the reference road angle when the vehicle 10 is turned off, and compares that value to the pitch of the vehicle when the vehicle 10 is turned back on. The controller 24 does not adjust headlamp aim if the pitch of the vehicle 10 is substantially the same as the recorded road angle.

The controller 24 is also configured to account for zero drift in the signal from the pitch sensor 26 when making this road angle R comparison. At 108, the controller 24 considers the effect of environmental conditions on the signal from the pitch sensor 26 when recording the road angle R, and also considers the same effect when comparing the recorded road angle to the pitch of the vehicle 10 when the vehicle 10 is turned back on. As generally discussed above, environmental conditions may affect the zero drift of the pitch sensor 26. In one example, when the road angle R is recorded at 106, the vehicle 10 had been operating for some time, and thus the temperature of the pitch sensor 26 may have been relatively high. When the vehicle 10 is parked for some time, the temperature of the pitch sensor 26 may cool down. Thus, when turning the vehicle 10 back on, the pitch sensor 26 may exhibit a different zero drift than when the road angle R was recorded. Accordingly, the controller 24 is configured to reference the lookup table 30, for example, to determine the zero drift of the pitch sensor 26 at all steps in the method 100. Doing so serves to increase the accuracy of the headlamp aim, and, specifically, prevents erroneous adjustments to the headlamps.

If, at 104, the controller 24 determines that the vehicle 10 is stopped, the controller 24 monitors for changes in pitch, at 110. Again, the controller 24 may determine that the vehicle 10 is stopped by monitoring whether any of the vehicle doors 12 are open, whether the vehicle 10 is in park, whether the speed of the vehicle is below a particular threshold, etc. The controller 24 interprets such changes in pitch as being brought about by a change in vehicle load, at 112. The controller 24 may also interpret changes in pitch that coincide with changes in tire pressure as being brought about by a change in vehicle load.

Figure 5:
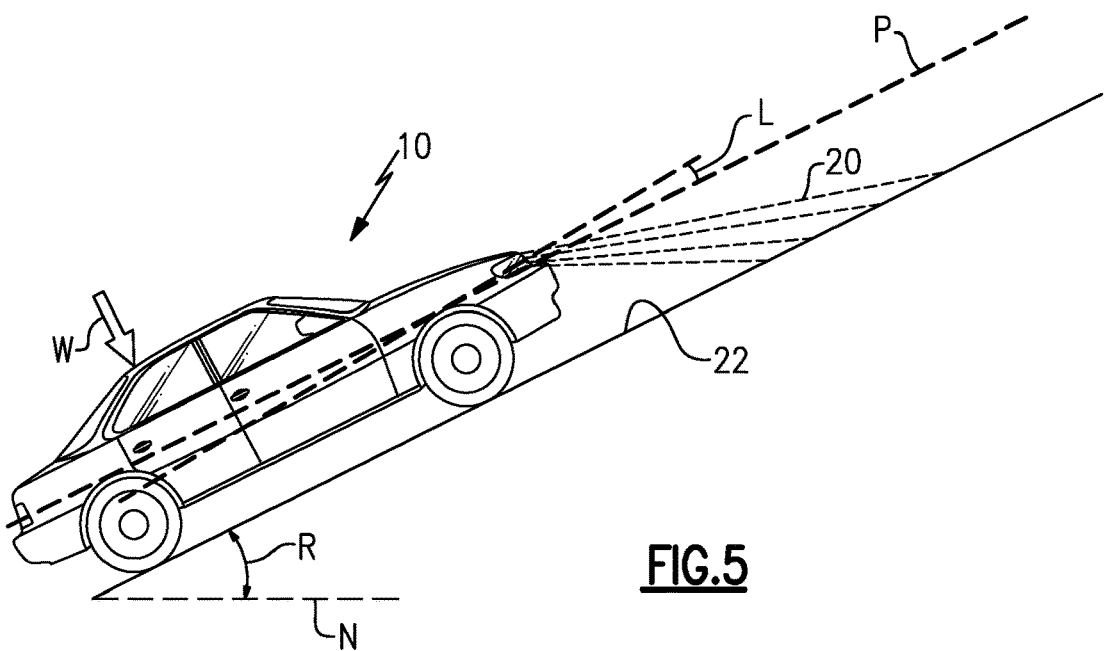
FIG. 5 illustrates a vehicle experiencing a load while on an inclined road.

For example, in FIG. 5, the vehicle 10 has parked on a hill, as in FIG. 4, and the reference road angle R is recorded by the controller 24. After being parked for some time, a user may add a load into the vehicle 10, such as luggage, groceries, occupants, etc. In this example, the load is added primarily into the rear of the vehicle. Accordingly, the weight W of the load changes the pitch of the vehicle 10, and the controller 24 is configured to determine a load angle L, which is shown as an incline relative to a reference pitch P. The reference pitch P may be determined in the factory setting of FIG. 3, in one example, and stored in the controller 24. Note that, in FIG. 5, the controller 24 accounts for the reference road angle R, and does not interpret the pitch of the vehicle 10 due to the reference road angle R as a change in pitch that warrants an adjustment to the headlamps 16, 18.

As with step 108, the controller 24 monitors and accounts for zero drift of the pitch sensor 26 at all times during the method 100. As such, at 114, the zero drift of the pitch sensor 26 that may be caused by changes in temperature, for example, are taken into account before the controller 24 commands an adjustment to the aim of the headlamps 16, 18, at 116. In this way, adjustments to the headlamps 16, 18 are more precise, and erroneous adjustments are prevented. In turn, the headlamps are not unintentionally aimed too low or too high.

While a sedan is shown in the figures, this disclosure is not limited to any particular type of vehicle. For example, this disclosure also extends to vehicles such as vans, sport utility vehicles (SUVs), sedans, sports cars, etc. This disclosure also extends to electrified and non-electrified vehicles.

It should be understood that terms such as "about," "substantially," and "generally" are not intended to be boundaryless terms, and should be interpreted consistent with the way one skilled in the art would interpret those terms. Further, directional terms such as "lateral," "longitudinal," "normal," "parallel," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a first sensor;
a second sensor;
a headlamp; and
a controller configured to adjust an aim of the headlamp based on a signal from the first sensor, wherein the controller is configured to relate an output of the second sensor to a zero drift of the first sensor, and wherein the controller is configured to account for the zero drift of the first sensor when adjusting the aim of the headlamp.

2. The motor vehicle as recited in claim 1, wherein the second sensor is an environmental sensor and the output of the second sensor is indicative of an environmental condition of the first sensor.

3. The motor vehicle as recited in claim 2, wherein the environmental condition is a temperature.

4. The motor vehicle as recited in claim 3, wherein the controller is configured to reference a lookup table to determine the zero drift of the first sensor based on a particular temperature corresponding to the output of the second sensor.

5. The motor vehicle as recited in claim 1, wherein the first sensor is configured to generate a signal indicative of a pitch of the motor vehicle.

6. The motor vehicle as recited in claim 5, wherein the controller is configured to interpret signals from the first sensor as corresponding to changes in pitch brought about by a change in road angle or by a change in vehicle load.

7. The motor vehicle as recited in claim 5, wherein the controller interprets a change in pitch when a velocity of the motor vehicle slows to zero as a reference road angle.

8. The motor vehicle as recited in claim 7, wherein, when the motor vehicle is stopped, the controller interprets a change in pitch relative to the reference road angle as a change in pitch brought about by a change in vehicle load.

9. The motor vehicle as recited in claim 5, wherein the controller interprets a change in pitch during a time when the vehicle is not in motion as being brought about by a change in vehicle load.

10. The motor vehicle as recited in claim 5, wherein the controller interprets a change in pitch during a time when a vehicle door is open as being brought about by a change in vehicle load.

11. The motor vehicle as recited in claim 5, further comprising a third sensor configured to output a signal indicative of a pressure of tires of the motor vehicle, wherein the controller interprets a change in pitch when the change in pitch coincides with a change in tire pressure as being brought about by a change in vehicle load.

12. The motor vehicle as recited in claim 1, wherein the controller further monitors a status of all vehicle doors, a pressure of all vehicle tires, and vehicle location.

13. The motor vehicle as recited in claim 1, wherein the first sensor is an accelerometer.

14. The motor vehicle as recited in claim 13, wherein the first sensor is mounted to one of restraint control module and a headlight control module.

15. The motor vehicle as recited in claim 1, further comprising an actuator assembly configured to adjust an aim of the headlamp in response to commands from the controller.

16. The motor vehicle as recited in claim 15, wherein the aim of the headlamp is an angle of a beam of light emitted from the headlamp.

17. The motor vehicle as recited in claim 15, wherein the actuator assembly is configured to adjust a vertical aim or a side-to-side aim of the headlamp.

18. A method, comprising:
accounting for a zero drift of a first sensor when adjusting an aim of a headlamp based on a signal from the first sensor, wherein the zero drift of the first sensor is indicated by an output of a second sensor.

19. The method as recited in claim 18, wherein the second sensor is an environmental sensor and the output of the second sensor is indicative of an environmental condition of the first sensor.

20. The method as recited in claim 19, wherein the environmental condition is a temperature.

21. The method as recited in claim 18, further comprising:
adjusting the aim of the headlamp based on a change in pitch of a motor vehicle brought about by at least a change vehicle load.

22. The method as recited in claim 21, further comprising:
storing a reference road angle; and
determining a change in pitch brought about by a change in load by comparing a change in pitch when the vehicle is stopped to the reference road angle.

23. The method as recited in claim 21, wherein the aim is adjusted by an actuator assembly in response to commands from a controller.

* * * * *